(12) United States Patent
Hua

(10) Patent No.: US 10,719,074 B2
(45) Date of Patent: Jul. 21, 2020

(54) METHOD AND APPARATUS FOR CONTROLLING SYSTEM ENERGY SAVING IN AN UNMANNED VEHICLE

(71) Applicant: Baidu Online Network Technology (Beijing) Co., Ltd., Beijing (CN)

(72) Inventor: Kuo Hua, Beijing (CN)

(73) Assignee: Baidu Online Network Technology (Beijing) Co., Ltd, Beijing (CN)

( * ) Notice: Subject to any disclaimer, the term of this patent is extended or adjusted under 35 U.S.C. 154(b) by 158 days.

(21) Appl. No.: 15/425,127

(22) Filed: Feb. 6, 2017

(65) Prior Publication Data

US 2018/0024545 A1 Jan. 25, 2018

(30) Foreign Application Priority Data

Jul. 22, 2016 (CN) .......................... 2016 1 0585772

(51) Int. Cl.

| | |
|---|---|
| *B60W 50/06* | (2006.01) |
| *G05D 1/00* | (2006.01) |
| *B60W 30/18* | (2012.01) |
| *B60W 40/04* | (2006.01) |
| *G05D 1/02* | (2020.01) |

(52) U.S. Cl.
CPC ..... *G05D 1/0005* (2013.01); *B60W 30/18054* (2013.01); *B60W 40/04* (2013.01); *B60W 50/06* (2013.01); *G05D 1/0246* (2013.01); *G05D 1/0257* (2013.01); *B60L 2200/40* (2013.01); *B60W 2420/42* (2013.01); *B60W 2420/52* (2013.01); *B60W 2510/24* (2013.01); *B60W 2520/04* (2013.01); *B60W 2555/60* (2020.02); *B60W 2900/00* (2013.01)

(58) Field of Classification Search
CPC ....................... G05D 1/0005; B60W 30/18054
See application file for complete search history.

(56) References Cited

U.S. PATENT DOCUMENTS

| | | | | |
|---|---|---|---|---|
| 6,037,901 | A | * 3/2000 | Devier ................... | E02F 9/2045 342/357.31 |
| 2005/0010351 | A1* | 1/2005 | Wagner ................. | G01S 13/931 701/96 |
| 2007/0112494 | A1* | 5/2007 | Naik ................... | B60K 31/0008 701/55 |
| 2012/0218412 | A1* | 8/2012 | Dellantoni ......... | G01C 21/3679 348/148 |

(Continued)

FOREIGN PATENT DOCUMENTS

CN 105151163 A 12/2015

*Primary Examiner* — Jess Whittington
(74) *Attorney, Agent, or Firm* — Knobbe, Martens, Olson & Bear, LLP

(57) ABSTRACT

Disclosed embodiments include a method and apparatus for controlling system energy saving in an unmanned vehicle. In some embodiments, the method comprises: determining, via a sensing device and a high-precision map, whether the unmanned vehicle is in a stop-and-wait state; positioning the unmanned vehicle system in a standby state if the unmanned vehicle is in the stop-and-wait state. Some embodiments lower wear and loss of the unmanned vehicle system, improve the continued travel capacity of the unmanned vehicle and make the design of the unmanned vehicle more green and environment-friendly.

18 Claims, 2 Drawing Sheets

(56) References Cited

U.S. PATENT DOCUMENTS

| | | | |
|---|---|---|---|
| 2013/0158838 A1* | 6/2013 | Yorke | B60W 10/115 |
| | | | 701/103 |
| 2015/0142248 A1* | 5/2015 | Han | G01C 21/3602 |
| | | | 701/23 |
| 2016/0215747 A1* | 7/2016 | Huber | F02N 11/0837 |
| 2017/0106888 A1* | 4/2017 | Shubs, Jr. | B61L 27/0061 |
| 2017/0174218 A1* | 6/2017 | Hansen | B60W 10/06 |
| 2017/0282921 A1* | 10/2017 | Limbacher | B60W 30/18018 |
| 2017/0315556 A1* | 11/2017 | Mimura | B60W 40/072 |

* cited by examiner

METHOD AND APPARATUS FOR CONTROLLING SYSTEM ENERGY SAVING IN AN UNMANNED VEHICLE

CROSS-REFERENCE TO RELATED APPLICATIONS

This application claims the benefit of Chinese Patent Application No. 201610585772.5, entitled "Method and Apparatus for Controlling System Energy Saving in an Unmanned Vehicle," filed on Jul. 22, 2016, which is hereby incorporated by reference in its entirety.

TECHNICAL FIELD

Embodiments of the present disclosure relate to intelligent control technologies, and particularly to method and apparatus for controlling system energy saving in an unmanned vehicle.

BACKGROUND

Along with development of science and technology, technical research on driverless vehicles, also called unmanned vehicles increases and becomes more and more mature. Since 1970's, developed countries such as the United States, Great Britain and Germany began to perform studies on unmanned vehicles, and made breaking-through progress in respect of feasibility and practicability. China began studies on unmanned vehicles since 1980's. In 1992, National University of Defense Technology succeeded in developing China's first truly unmanned vehicle.

Based on perceived information such as roads, vehicle position and barriers, an unmanned vehicle controls steering directions and speed of the vehicle to enable the vehicle to drive safely and reliably on the road. The unmanned vehicle integrates many technologies such as automation control, system structure, artificial intelligence and visual computing, proves to be a product of advanced development in computer sciences, model recognition and intelligent control technologies, as well as an important indication of scientific research power and industrial level of a country, and boasts a broad application prospect in the fields such as national defense and national economy.

The unmanned vehicle will be confronted with different road conditions during travel. At this time, all modules in the unmanned vehicle system are in a state of high-speed run, which causes unnecessary wear and loss and does not meet energy-saving and environment-friendly requirements.

SUMMARY

Some embodiments of the present disclosure provide a method and apparatus for controlling system energy saving in an unmanned vehicle to reduce wear and loss of the unmanned vehicle system, improve a continued travel capacity of the unmanned vehicle, and provide a more green and environment-friendly design.

According to a first aspect of some embodiments of the present disclosure, method for controlling system energy saving in an unmanned vehicle includes:
determining, via a sensing device and a high-precision map, whether the unmanned vehicle is in a stop-and-wait state;
positioning the unmanned vehicle system in a standby state if the unmanned vehicle is in the stop-and-wait state.

According to a second aspect of some embodiments of the present disclosure, an apparatus for controlling system energy saving in an unmanned vehicle includes:
an unmanned vehicle state determining module configured to determine, via a sensing device and a high-precision map, whether the unmanned vehicle is in a stop-and-wait state;
a standby state positioning module configured to position the unmanned vehicle system in a standby state if the unmanned vehicle is in the stop-and-wait state.

In some embodiments of the present disclosure, whether the unmanned vehicle is in the stop-and-wait state is determined through the sensing device and the high-precision map; if the unmanned vehicle is in the stop-two-wait state, the unmanned vehicle system is positioned in the standby state to thereby lower wear and loss of the unmanned vehicle system, improve the continued travel capacity of the unmanned vehicle and make the design of the unmanned vehicle more green and environment-friendly.

DETAILED DESCRIPTION OF EMBODIMENTS

The present disclosure is described in further detail in conjunction with figures and embodiments. It may be appreciated that specific embodiments described here are only intended to illustrate the present disclosure, not to limit the present disclosure. In addition, it is noticeable that for ease of description, figures only show partial structures related to the present disclosure, not all structures. Although the present disclosure describes numerated embodiments, the embodiments described within each numerated embodiment may be combined or separated.

Embodiment 1

Figure 1:
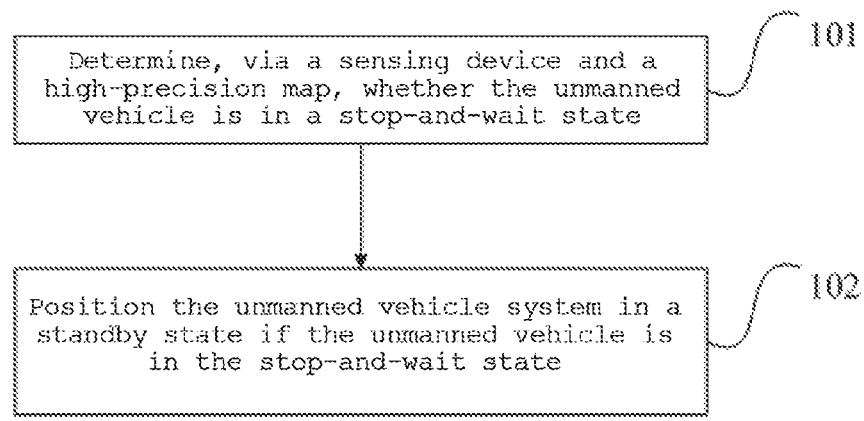
FIG. 1 is a flow chart of a method for controlling system energy saving in an unmanned vehicle according to some embodiments.

FIG. 1 is a flowchart of a method for controlling system energy saving in an unmanned vehicle according to some embodiments. Some embodiments of the present disclosure may be adapted for the case that the unmanned vehicle runs on a road. The method may be implemented by a control terminal integrated in the unmanned vehicle and can comprise the following steps:

Step 101: determining, via a sensing device and a high-precision map, whether the unmanned vehicle is in a stop-and-wait state.

During travel, the unmanned vehicle, via a sending device mounted thereon, senses road conditions and travel conditions of other surrounding running vehicle. In some embodiments, the sensing device comprise a radar, sonar, high-definition camera, laser and the like. In addition to precisely positioning the unmanned vehicle, the radar may measure running speeds of vehicles before and after the unmanned vehicle. In some embodiments, a radar is mounted in a front and rear of the unmanned vehicle. The sonar is usually used in cooperation with the radar to detect whether there is a barrier in the road, and detect dynamic states of vehicles in other directions surrounding the unmanned vehicle. A plurality of high-definition cameras are usually mounted in the unmanned vehicle to acquire video information surrounding the unmanned vehicle from multiple view angles so that precise road conditions may be obtained through the video information and the high-precision map used in cooperation. The laser device is mainly used to measure a distance. Although there are many distance-measuring sensing devices in the prior art, the laser device exhibits a higher precision and meanwhile the laser device usually may rotate 360° to improve the detection capability of the unmanned vehicle.

The high-precision map is an important assistant software of the unmanned vehicle during travel, it may assist the unmanned vehicle in perceiving in advance road condition information that is to occur, and may enable the unmanned vehicle to globally control the travel route and various facilities on the travel route. The precision of the high-precision map may reach a magnitude of centimeter. In some embodiments, in the high-precision map are recorded parameters such as lane line type, lane width, road shape, road slope, road curvature and road paving direction to help the unmanned vehicle to better perceive road condition information. Meanwhile, in the high-precision map are recorded a lot of target data such as elevated objects, guard rails, trees, road edge type, roadside landmark and traffic light facilities.

During travel, the unmanned vehicle system adjusts his own travel state such as acceleration, deceleration, turning or stopping to wait based on different road conditions and travel conditions of other surrounding vehicles. In this step, the sensing device and high-precision map are used to determine whether the unmanned vehicle is in the stop-and-wait state and to subsequently judge whether to perform energy saving control.

Step 102: positioning the unmanned vehicle system in a standby state if the unmanned vehicle is in the stop-and-wait state.

The unmanned vehicle system, as a brain of the unmanned vehicle, performs thorough decision-making and control of auto-driving of the unmanned vehicle. The unmanned vehicle system performs comprehensive processing for data obtained by the sensing device and uses the high-precision map in cooperation. In some embodiments, the unmanned vehicle system mainly performs vehicle positioning, vehicle travel control, vehicle stability control, auto-parking, vehicle alarming, lane retention, anti-collision, 3D visual monitoring, electromagnetic control and the like. Upon performing vehicle positioning, the unmanned vehicle system mainly employs magnetic navigation and visual navigation and can accurately recognize the vehicle position. Control of vehicle travel by the unmanned vehicle system mainly comprises speed control and direction control, a commonly-used algorithm is PID control algorithm which mainly comprises fuzziness-based PID control algorithm and neural network-based PID control algorithm. The vehicle stability control is implemented mainly through an ESP (Electronic Stability Program), and an electronic handbrake and other various electronic stability modules to prevent the vehicle out of control. The unmanned vehicle system may implement auto parking in place of the vehicle via an auto-parking module by virtue of the radar. By receiving signals of the radar mounted at the bumper, the unmanned vehicle system sends warning information about detected barriers when a blind spot occurs to the unmanned vehicle. The unmanned vehicle system recognizes lane mark lines by acquiring a sensing device mounted on a windshield. If the unmanned vehicle deviates away from lane lines, the unmanned vehicle system controls a steering wheel to adjust a travel orientation. The anti-collision function is implemented mainly by using a sensing device mounted at the bumper to measure a distance between the unmanned vehicle and a vehicle ahead. The unmanned vehicle performs braking control based on the obtained inter-vehicle distance. The 3D visual monitoring is implemented mainly by receiving video information collected by a camera device mounted at the windshield, and recognizing the video information to determine whether there is a pedestrian or bicycle, and performing 3D monitoring for environment conditions surrounding the unmanned vehicle. The electromagnetic control in the unmanned vehicle system is implemented mainly by using electromagnetic principles to control corresponding parts.

As known from the foregoing content, the unmanned vehicle system has powerful and complicated functions and it causes larger loss during travel, wherein many functions such as vehicle positioning, vehicle travel control, vehicle stability control, lane retention and anti-collision are not used while the vehicle is in a stopped state and therefore cause unnecessary energy loss. In this step, if the unmanned vehicle is in a stop-and-wait state, the unmanned vehicle system is positioned in a standby state. In some embodiments, a standby instruction may be sent to modules in the unmanned vehicle system to trigger the unmanned vehicle to make an running event standby, and respective modules stop running after reception of the standby instruction and remain in the standby state to avoid loss caused by unnecessary running and decision making.

In the technical solution of some embodiments of the present embodiment, whether the unmanned vehicle is in the stop-and-wait state is determined through the sensing device and the high-precision map; if the unmanned vehicle is in the stop-and-wait state, the unmanned vehicle system is positioned in the standby state to thereby lower wear and loss of the unmanned vehicle system, improve the continued travel capacity of the unmanned vehicle and make the design of the unmanned vehicle more green and environment-friendly.

Embodiment 2

Figure 2:
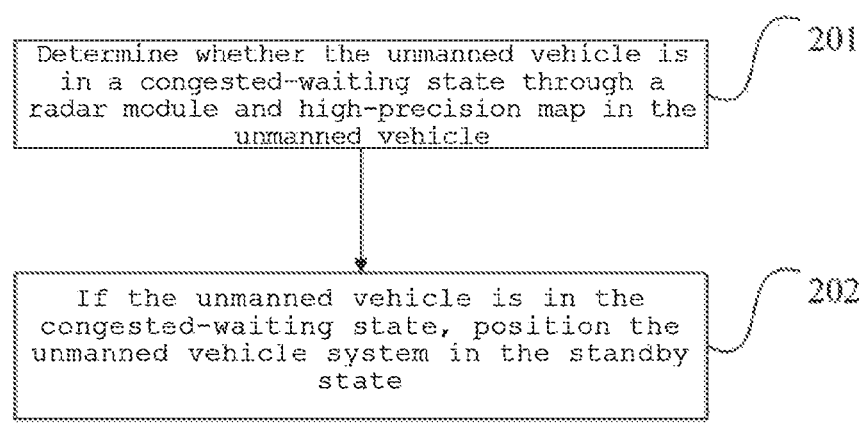
FIG. 2 is a flowchart of a method for controlling system energy saving in an unmanned vehicle according to some embodiments.

FIG. 2 is a flowchart of a method for controlling system energy saving in an unmanned vehicle according to some embodiments. The illustrated flow chart may be based on Embodiment 1 and can provide a method for controlling system energy saving in an unmanned vehicle when the unmanned vehicle is in a stopped state. The method may be implemented by a control terminal integrated on the unmanned vehicle and can comprise the following steps:

Step 201: determining whether the unmanned vehicle is in a congested-waiting state through the radar module and high-precision map in the unmanned vehicle.

During travel, the unmanned vehicle is often confronted with traffic jam due to complexity of road conditions. The situation might be caused by sudden events such as road construction or traffic accidents. When the unmanned vehicle is in a traffic jam situation, it will remain in a stopped state for a long time period, and obviously will cause much unnecessary wear and loss if the unmanned vehicle system still runs thoroughly. In this step, whether the unmanned vehicle is in a congested-waiting state is determined through the radar module and high-precision map in the unmanned vehicle, the radar module may monitor travel conditions of vehicles before and after the unmanned vehicle, and road information (e.g., whether the road is smooth or congested) of a road segment on which the unmanned vehicle is travelling currently may be obtained by querying to the high-precision map. In some embodiments, when the radar module detects that the vehicles before and after the unmanned vehicle are all in a stationary state and the current road segment is found in a congested state by querying to the high-precision map, it is confirmed that the unmanned vehicle is in the congested and waiting state at this time.

Step 202: if the unmanned vehicle is in the congested-waiting state, positioning the unmanned vehicle system in the standby state.

In this step, when it is judged that the unmanned vehicle is in the congested-waiting state, this means that the unmanned vehicle will not activate travel in a longer time period. Many functions in the unmanned vehicle system are used only when the unmanned vehicle is in a traveling state. Unnecessary energy loss will be certainly caused when the functions are still in a running state when the unmanned vehicle is in the stopped vehicle. Hence, when the unmanned vehicle is determined in the congested-waiting state, the unmanned vehicle system is positioned in the standby state to save energy.

In the technical solution of some embodiments of the present disclosure, whether the unmanned vehicle is in a congested-waiting state is determined through the radar module and high-precision map in the unmanned vehicle to reasonably distinguish and recognize the stop-and-wait state. If the unmanned vehicle is in the congested-waiting state, the unmanned vehicle system is positioned in the standby state so that the energy-saving manner for the unmanned vehicle system is made more precise and efficient.

On the basis of the above embodiments, positioning the unmanned vehicle system in the standby state comprises positioning other modules in the unmanned vehicle system other than the radar module to be in the standby state. In some embodiments, when the unmanned vehicle is determined in the congested-waiting state through the radar module and high-precision map, the radar module is in a normal operation state to detect whether vehicles in front of the unmanned vehicle get started and facilitate awakening other modules in standby state in the unmanned vehicle system.

Embodiment 3

Figure 3:
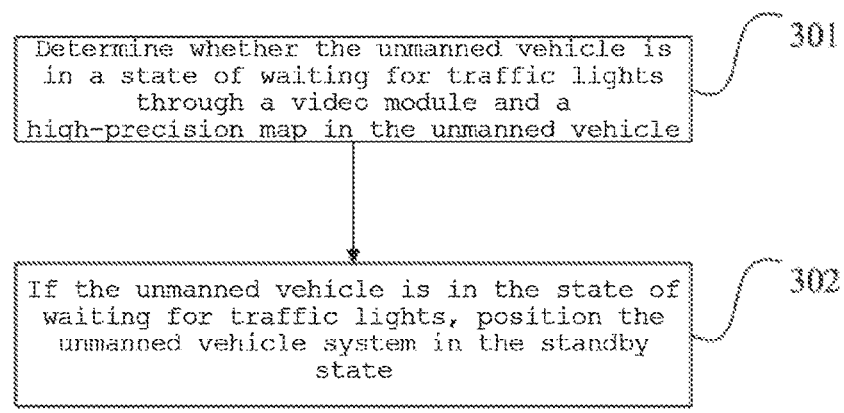
FIG. 3 is a flow chart of a method for controlling system energy saving in an unmanned vehicle according to some embodiments.

FIG. 3 is a flowchart of a method for controlling system energy saving in an unmanned vehicle according to some embodiments. The illustrated flow chart may be based on the above Embodiments and can provide a method for controlling system energy saving in an unmanned vehicle when the unmanned vehicle is in a stopped state. The method may be implemented by a control terminal integrated on the unmanned vehicle and can comprise the following steps:

Step 301: determining whether the unmanned vehicle is in a state of waiting for traffic lights through the video module and the high-precision map in the unmanned vehicle.

During the actual travel, the unmanned vehicle recognizes traffic lights on the road to determine whether to run normally to pass when the unmanned vehicle comes to a crossing or some pedestrians are crossing the crosswalk. In some embodiments, when the recognized traffic light is a red light that is on, the unmanned vehicle needs to brake to wait; when the recognized traffic light is a green light that is on, the unmanned vehicle may pass normally; if the recognized traffic light is a yellow light that is blinking, the unmanned vehicle needs to slow down to pass the road segment. In the current conditions, red light waiting duration is longer in many big cities, and there are many crossings, namely, there are many traffic light facilities, so the unmanned vehicle, during travel on the road, needs to recognize traffic lights for many time times and wait for the red light to turn into green light. In this step, whether the unmanned vehicle is in a state of waiting for traffic lights is determined through the video module and the high-precision map in the unmanned vehicle. Specifically, the video module may collect images of road information ahead the unmanned vehicle and traffic light facilities at the crossing, and the collected images are recognized auxiliarily by querying for parameters such as a shape, height and combination state of traffic light facilities of the road segment recorded in the high-precision map, to determine whether the unmanned vehicle is in the state of waiting for traffic lights.

Step 302: if the unmanned vehicle is in the state of waiting for traffic lights, positioning the unmanned vehicle system in the standby state.

In this step, when it is judged that the unmanned vehicle is in the state of waiting for traffic lights, this means that the unmanned vehicle will not activate travel in a longer time period. Many functions in the unmanned vehicle system are used only when the unmanned vehicle is in a traveling state. Unnecessary energy loss will be certainly caused when the functions are still in a running state when the unmanned vehicle is in the stopped vehicle. Hence, when the unmanned vehicle is determined in the state of waiting for traffic lights, the unmanned vehicle system is positioned in the standby state to save energy.

In the technical solution of some embodiments of the present disclosure, whether the unmanned vehicle is in the state of waiting for traffic lights is determined through the video module and the high-precision map in the unmanned vehicle to reasonably distinguish and recognize the stop-and-wait state. If the unmanned vehicle is in the state of waiting for traffic lights, the unmanned vehicle system is positioned in the standby state so that the energy-saving manner for the unmanned vehicle system is made more precise and efficient.

On the basis of the above embodiments, positioning the unmanned vehicle system in the standby state comprises positioning other modules in the unmanned vehicle system other than the video module to be in the standby state. In some embodiments, when the unmanned vehicle is determined in the state of waiting for traffic lights through the video module and the high-precision map, the video module is in a normal operation state to detect whether a light-on state of traffic lights changes to facilitate awakening other modules in standby state in the unmanned vehicle system.

On the basis of the above embodiments, after positioning the unmanned vehicle system in the standby state, the method further comprises: positioning the unmanned vehicle system in a normal operation state if detecting an unmanned vehicle system operation-restoring event generated on the basis of the sensing device and the high-precision map. In some embodiments, the operation-restoring event may be cancellation of the congested-waiting state or the state of waiting for traffic lights.

Embodiment 4

Figure 4:
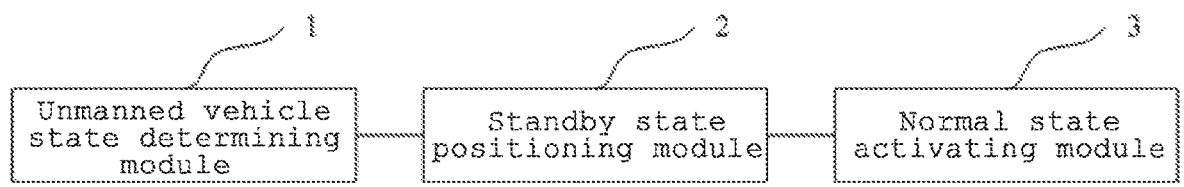
FIG. 4 is a block diagram of an apparatus for controlling system energy saving in an unmanned vehicle according to some embodiments.

FIG. 4 is a block diagram of an apparatus for controlling system energy saving in an unmanned vehicle according some embodiments. The apparatus can comprise:

an unmanned vehicle state determining module 1 configured to determine, via a sensing device and a high-precision map, whether the unmanned vehicle is in a stop-and-wait state;

a standby state positioning module 2 configured to position the unmanned vehicle system in a standby state if the unmanned vehicle is in the stop-and-wait state.

In the technical solution of some embodiments of the present disclosure, whether the unmanned vehicle is in the stop-and-wait state is determined through the sensing device and the high-precision map; if the unmanned vehicle is in the stop-two-wait state, the unmanned vehicle system is positioned in the standby state to thereby lower wear and loss of the unmanned vehicle system, improve the continued travel capacity of the unmanned vehicle and make the design of the unmanned vehicle more green and environment-friendly.

In some embodiments, on the basis of the above technical solution, the unmanned vehicle state determining module 1 is specifically used to:

determine whether the unmanned vehicle is in a congested-waiting state through the radar module and high-precision map in the unmanned vehicle;

In some embodiments, the standby state positioning module 2 is specifically configured to:

if the unmanned vehicle is in the congested-waiting state, position the unmanned vehicle system in the standby state.

In some embodiments, on the basis of the above technical solution, the standby state positioning module 2 is specifically configured to:

position other modules in the unmanned vehicle system other than the radar module to be in the standby state.

In some embodiments, on the basis of the above technical solution, the unmanned vehicle state determining module 1 is specifically used to:

determine whether the unmanned vehicle is in a state of waiting for traffic lights through the video module and the high-precision map in the unmanned vehicle;

In some embodiments, the standby state positioning module 2 is specifically configured to:

if the unmanned vehicle is in the state of waiting for traffic lights, position the unmanned vehicle system in the standby state.

In some embodiments, on the basis of the above technical solution, the standby state positioning module 2 is specifically configured to:

position other modules in the unmanned vehicle system other than the video module to be in the standby state.

On the basis of the above technical solution, the apparatus further comprises:

a normal state activating module 3 configured to position the unmanned vehicle system in a normal operation state if detecting an unmanned vehicle system operation-restoring event generated on the basis of the sensing device and the high-precision map.

The above described modules products may implement any of the steps of the method provided by any embodiment of the present disclosure, and include corresponding function modules for performing steps of the method and exhibit advantageous effects.

It is appreciated that the above description relates to some embodiments of the present disclosure and utilized technical principles. Those skilled in the art appreciate that the present disclosure is not limited to specific embodiments described here. Those skilled in the art may make various obvious variations, re-adjustments and substitutions without departing from the protection scope of the present disclosure. Hence, although the present disclosure is described in detail with the above embodiments, the present disclosure is not merely limited to the above embodiments, and it, without departing from the ideas of the present disclosure, may further comprise more other equivalent embodiments. The scope of the present disclosure is defined by the appended claims. Various components disclosed and/or illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for controlling system energy saving in an unmanned vehicle, comprising:

determining, via a sensing device and a high-precision map, whether the unmanned vehicle is in a stop-and-wait state; and positioning an unmanned vehicle system in a standby state in response to the unmanned vehicle being in the stop-and-wait state, wherein the unmanned vehicle system performs decision-making and control of auto-driving of the unmanned vehicle including at least one of: vehicle positioning, vehicle travel control comprising speed control and direction control, vehicle stability control, lane retention or anti-collision, and wherein the standby state comprises a non-running state, wherein the positioning the unmanned vehicle system in the standby state comprises:

positioning modules in the unmanned vehicle system other than the sensing device to be in the standby state, wherein the modules comprise an electronic stability module and an auto-parking module, and the sensing device comprises at least one of a radar module or a video module.

2. The method according to claim 1, wherein determining, via the sensing device and the high-precision map, whether the unmanned vehicle is in the stop-and-wait state, comprises: determining whether the unmanned vehicle is in a congested-waiting state through the radar module and the high-precision map in the unmanned vehicle; wherein positioning the unmanned vehicle system in the standby state in response to the unmanned vehicle being in the stop-and-wait state comprises: in response to the unmanned vehicle being in the congested-waiting state, positioning the unmanned vehicle system performing decision-making and control of auto-driving of the unmanned vehicle in the standby state.

3. The method according to claim 1, wherein determining, via the sensing device and the high-precision map, whether the unmanned vehicle is in the stop-and-wait state, comprises: determining whether the unmanned vehicle is in a state of waiting for traffic lights through the video module and the high-precision map in the unmanned vehicle; wherein positioning the unmanned vehicle system in the standby state in response to the unmanned vehicle being in the stop-and-wait state comprises: in response to the unmanned vehicle being in the state of waiting for traffic lights, positioning the unmanned vehicle system performing decision-making and control of auto-driving of the unmanned vehicle in the standby state.

4. The method according to claim 1, wherein positioning the unmanned vehicle system in the standby state further comprises: positioning the unmanned vehicle system performing decision-making and control of auto-driving of the unmanned vehicle in a normal operation state in response to detecting an unmanned vehicle system operation-restoring event generated using the sensing device and the high-precision map.

5. The method according to claim 1, wherein positioning the unmanned vehicle system in the standby state comprises: sending a standby instruction to modules in the unmanned vehicle system performing decision-making and control to instruct the modules to stop running, wherein the modules are modules that are not being used when the unmanned vehicle is in a stop state.

6. The method according to claim 1, wherein positioning the unmanned vehicle system in the standby state further comprises:
positioning the high-precision map in the standby state.

7. An apparatus for controlling system energy saving in an unmanned vehicle, comprising:
at least one processor; and
a memory storing instructions, which when executed by the at least one processor, cause the at least one processor to perform operations comprising:
determining, via a sensing device and a high-precision map, whether the unmanned vehicle is in a stop-and-wait state; and
positioning an unmanned vehicle system in a standby state in response to the unmanned vehicle being in the stop-and-wait state, wherein the unmanned vehicle system performs decision-making and control of auto-driving of the unmanned vehicle including at least one of: vehicle positioning, vehicle travel control comprising speed control and direction control, vehicle stability control, lane retention or anti-collision, and wherein the standby state comprises a non-running state,
wherein the positioning the unmanned vehicle system in the standby state comprising:
positioning modules in the unmanned vehicle system other than the sensing device to be in the standby state, wherein the modules comprise an electronic stability module and an auto-parking module, and the sensing device comprises at least one of a radar module or a video module.

8. The apparatus according to claim 7, wherein determining, via the sensing device and the high-precision map, whether the unmanned vehicle is in the stop-and-wait state, comprises: determining whether the unmanned vehicle is in a congested-waiting state through the radar module and high-precision map in the unmanned vehicle; wherein positioning the unmanned vehicle system in the standby state in response to the unmanned vehicle being in the stop-and-wait state comprises: in response to the unmanned vehicle being in the congested-waiting state, positioning the unmanned vehicle system performing decision-making and control of auto-driving of the unmanned vehicle in the standby state.

9. The apparatus according to claim 7, wherein determining, via the sensing device and the high-precision map, whether the unmanned vehicle is in the stop-and-wait state, comprises:
determining whether the unmanned vehicle is in a state of waiting for traffic lights through the video module and the high-precision map in the unmanned vehicle; wherein positioning the unmanned vehicle system in the standby state in response to the unmanned vehicle being in the stop-and-wait state comprises:
in response to the unmanned vehicle being in the state of waiting for traffic lights, positioning the unmanned vehicle system performing decision-making and control of auto-driving of the unmanned vehicle in the standby state.

10. The apparatus according to claim 7, wherein positioning the unmanned vehicle system in the standby state further comprises: positioning the unmanned vehicle system performing decision-making and control of auto-driving of the unmanned vehicle in a normal operation state in response to detecting an unmanned vehicle system operation-restoring event generated using the sensing device and the high-precision map.

11. The apparatus according to claim 7, wherein positioning the unmanned vehicle system in the standby state further comprises: positioning the high-precision map in the standby state.

12. The apparatus according to claim 7, wherein positioning the unmanned vehicle system in the standby state comprises: sending a standby instruction to modules in the unmanned vehicle system performing decision-making and control to instruct the modules to stop running, wherein the modules are modules that are not being used when the unmanned vehicle is in a stop state.

13. A non-transitory computer storage medium storing a computer program, which when executed by one or more processors, causes the one or more processors to perform operations comprising:
determining, via a sensing device and a high-precision map, whether an unmanned vehicle is in a stop-and-wait state; and
positioning an unmanned vehicle system in a standby state in response to the unmanned vehicle being in the stop-and-wait state, wherein the unmanned vehicle system performs decision-making and control of auto-driving of the unmanned vehicle including at least one of: vehicle positioning, vehicle travel control comprising speed control and direction control, vehicle stability control, lane retention or anti-collision, and wherein the standby state comprises a non-running state,
wherein the positioning the unmanned vehicle system in the standby state comprises:
positioning modules in the unmanned vehicle system other than the sensing device to be in the standby state, wherein the modules comprise an electronic stability module and an auto-parking module, and the sensing device comprises at least one of a radar module or a video module.

14. The non-transitory computer storage medium according to claim 13, wherein determining, via the sensing device and the high-precision map, whether the unmanned vehicle is in the stop-and-wait state, comprises: determining whether the unmanned vehicle is in a congested-waiting state through the radar module and high-precision map in the unmanned vehicle; wherein positioning the unmanned vehicle system in the standby state in response to the unmanned vehicle is in the stop-and-wait state comprises: in response to the unmanned vehicle being in the congested-waiting state, positioning the unmanned vehicle system performing decision-making and control of auto-driving of the unmanned vehicle in the standby state.

15. The non-transitory computer storage medium according to claim 13, wherein determining, via the sensing device and the high-precision map, whether the unmanned vehicle is in the stop-and-wait state, comprises: determining whether the unmanned vehicle is in a state of waiting for traffic lights through the video module and the high-precision map in the unmanned vehicle; wherein positioning the unmanned vehicle system in the standby state in response to the unmanned vehicle being in the stop-and-wait state comprises: in response to the unmanned vehicle being in the state of waiting for traffic lights, positioning the unmanned vehicle system performing decision-making and control of auto-driving of the unmanned vehicle in the standby state.

16. The non-transitory computer storage medium according to claim 13, wherein positioning the unmanned vehicle system in the standby state further comprises: positioning the unmanned vehicle system performing decision-making and control of auto-driving of the unmanned vehicle in a normal operation state in response to detecting an unmanned vehicle system operation-restoring event generated using the sensing device and the high-precision map.

17. The non-transitory computer storage medium according to claim 13, wherein positioning the unmanned vehicle system in the standby state further comprises: positioning the high-precision map in the standby state.

18. The non-transitory computer storage medium according to claim 13, wherein positioning the unmanned vehicle system in the standby state comprises: sending a standby instruction to modules in the unmanned vehicle system performing decision-making and control to instruct the modules to stop running, wherein the modules are modules that are not being used when the unmanned vehicle is in a stop state.

* * * * *